R. S. STRATTON.
PNEUMATIC TIRE.
APPLICATION FILED MAY 25, 1914.
1,139,597.
Patented May 18, 1915.
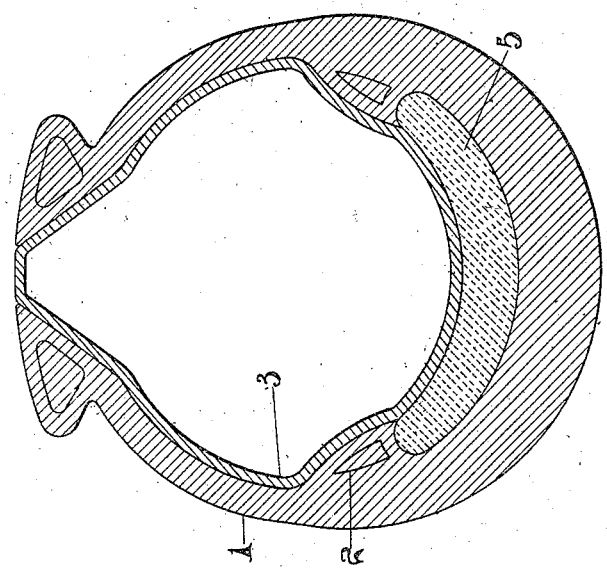
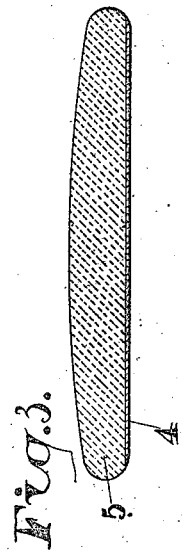
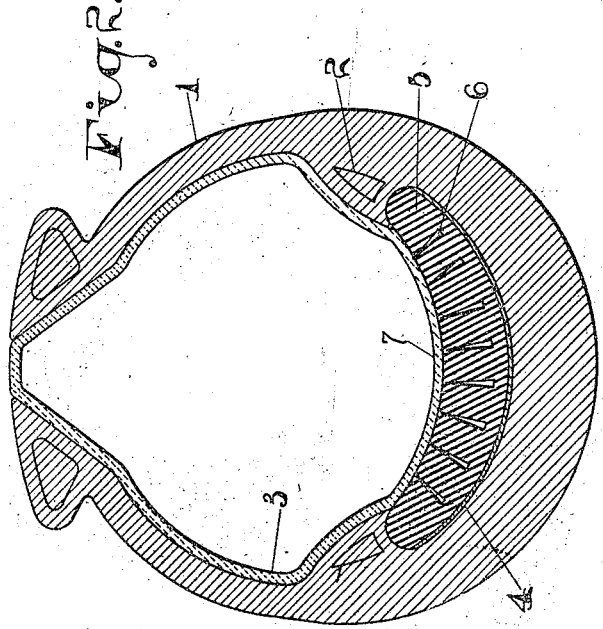
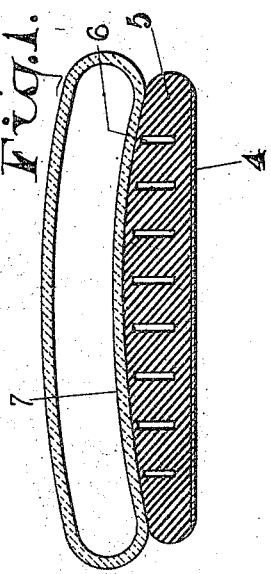
WITNESSES.
N. R. Tyndall.
E. P. Hall.
INVENTOR.
R. S. Stratton
BY J. Edward Maybee
ATTY.

UNITED STATES PATENT OFFICE.

ROBERT S. STRATTON, OF ORILLIA, ONTARIO, CANADA.

PNEUMATIC TIRE.

1,139,597.

Specification of Letters Patent.

Patented May 18, 1915.

Application filed May 25, 1914. Serial No. 840,945.

*To all whom it may concern:*

Be it known that I, ROBERT S. STRATTON, of the town of Orillia, Province of Ontario, Canada, have invented certain new and useful Improvements in Pneumatic Tires, of which the following is a specification.

This invention relates to means for preventing the escape of air in the event of the inner tube of a tire becoming punctured, and my object is to devise a suitable attachment for the purpose and means for accurately positioning such attachment in the tire.

I attain my object by forming a tread cushion substantially as hereinafter described and by providing the inside of the tire with annular lugs between which the cushion is fitted in a state of compression, the said cushion being connected with the inner tube so that the positioning of the cushion also positions the inner tube.

The invention is illustrated in the accompanying drawings in which—

Figure 1 is a cross section of a preferred form of my attachment secured to the inner tube and in position as it appears when detached from the outer cover. Fig. 2 is a similar view showing the attachment and inner tube in place in the outer cover. Fig. 3 is a cross section of a modification in position as it appears detached from the outer cover; and Fig. 4 is a cross section showing a further modification in position in an outer cover.

In the drawings like numerals of reference indicate corresponding parts in the different figures.

1 is an outer cover, inside which at each side is formed or secured an annular rib 2 extending completely around the cover. Preferably the faces of the ribs or lugs are concavely curved as shown.

3 is the inner tube. In one form the tread cushion comprises a flexible band 4, preferably of some textile fabric such as cotton duck. This band is of suitable length to extend circumferentially around the tire within the cover. To this band is suitably cemented or vulcanized a rubber cushion 5. In its simplest form this cushion is continuous from side to side and its ends are rounded to engage the inner faces of the ribs 2. Normally this rubber cushion is in an expanded condition, the band 4 being approximately flat in cross section, (see Figs. 1 and 3). When, however, the band is curved up to the form indicated in Fig. 2, the rubber toward the inner side is compressed, and this compression is increased when the tire is pumped up.

The use of the flexible band 4 is not essential, as the cushion 5 may be formed of such a width that when it is forced into position between the ribs 2, the rubber is placed in a state of compression, (see Fig. 4.)

While, as stated, a continuous rubber cushion may be employed, (see Figs. 3 and 4), preferably the cushion is divided circumferentially to form ribs 6, separated by narrow spaces. While the cushion may be used detached from the inner tube as shown in Fig. 4, it is preferably secured thereto as shown in Figs. 1 and 2. When the rubber cushion is divided into ribs as shown, I find that it is possible to make the cushion of a low grade of rubber, particularly if an inner cushion 7 of high grade elastic rubber be employed, vulcanized or otherwise suitably secured to the inner sides of the ribs. This cushion 7 is preferably formed as part of the inner tube 3. When the cushion 5 is formed of a low grade of rubber and is divided into ribs by spaces, it is readily forced into position between the annular lugs 2 despite the comparative lack of elasticity of the low grade rubber, while the inner cushion 7 is very markedly compressed.

It will be seen that the annular ribs 2 form a very convenient means of positioning the tread cushion and of holding it in place. They also afford ready means for effecting a compression of the tread cushion so that the flexible band 4 may be dispensed with.

In the preferred form in which the inner tube 3 is secured to the tread cushion, the annular ribs 2 also perform a very important function in accurately positioning the inner tube and of enabling it to be inserted into the cover without being first partly inflated. It is always difficult to insert an inner tube in such a way that it will not become pinched and will accurately lie in its proper position, and this trouble is aggravated when a puncture closing cushion or attachment has to be applied and accurately positioned between the inner tube and the cover. The use of the annular ribs 2 enables the inner tube and the attachment to be placed in position with the greatest ease, and so that any danger of damaging the inner tube is entirely obviated.

What I claim as my invention is:

1. A puncture closing pneumatic tire comprising a tire cover, an annular lug inside the cover at each side adjacent the tread, an inner tube, and an annular rubber tread cushion secured to the tread surface of the inner tube, said tread cushion being normally of greater width at its inner side than the arc between said lugs which it follows when in place, and held between the said lugs with its inner side in a state of compression.

2. In a puncture closing pneumatic tire the combination of a tire cover, an annular lug inside the cover at each side adjacent the tread, and an annular tread cushion fitted between said lugs comprising a plurality of circumferential ribs connected at their outer circumferences and normally separated by spaces and a band-shaped compressible inner rubber cushion to which the inner sides of the ribs are connected, the tread cushion being so shaped and proportioned that when in position in the tire the ribs are pressed into contact toward their inner circumferences and the inner rubber cushion is in a state of compression; and an inner tube with which the aforesaid inner rubber cushion is integral.

3. In a puncture closing pneumatic tire the combination of a tire cover, an annular lug inside the cover at each side adjacent the tread, and an annular tread cushion fitted between said lugs comprising a band of flexible non-stretchable material and a rubber cushion connected thereto, said rubber cushion being divided circumferentially into a plurality of ribs each connected with the band, the tread cushion being so shaped that when fitted between said lugs the rubber is in a state of compression, and an inner tube with which the aforesaid inner rubber cushion is integral.

4. In a puncture closing pneumatic tire the combination of a tire cover, an annular lug inside the cover at each side adjacent the tread, and an annular tread cushion fitted between said lugs comprising a band of flexible non-stretchable material, a plurality of circumferential ribs normally separated by spaces and a band-shaped compressible inner rubber cushion to which the inner sides of the ribs are connected, the tread cushion being so shaped and proportioned that when in position in the tire the ribs are pressed into contact and the inner rubber cushion is in a state of compression.

Orillia, Ont., this thirteenth day of May, A. D. 1914.

ROBERT S. STRATTON.

Signed in the presence of—
M. B. TUDHOPE,
J. S. CULL.